UNITED STATES PATENT OFFICE.

NELSON J. RUGGLES, OF COLUMBUS, OHIO.

WALL-PLASTER.

SPECIFICATION forming part of Letters Patent No. 708,591, dated September 9, 1902.

Application filed February 26, 1902. Serial No. 95,715. (No specimens.)

*To all whom it may concern:*

Be it known that I, NELSON J. RUGGLES, a citizen of the United States, residing at Columbus, in the county of Franklin and State of Ohio, have invented certain new and useful Improvements in Wall-Plaster; and I do hereby declare the following to be a full, clear, and exact description of the invention, such as will enable others skilled in the art to which it appertains to make and use the same.

Heretofore the solids of plaster have usually been mixed or prepared at the time and place of use.

The object of the present invention is to provide a prepared plaster that can be shipped dry in bags or in bulk and shall only need the addition of sufficient water to make it plastic to make it ready for application to walls. To carry out this idea and to secure the best results, I have discovered that the lime which constitutes the base of plaster must be specially treated and that the other materials hereinafter recited should be used and in substantially the proportions stated.

For plastering on wood or metal lath the prepared plaster is made as follows, to wit: lime, three hundred and seventy-five pounds; fire-clay, two hundred and fifty pounds, ground and dried; sand, sixteen hundred pounds, dried; hair, four and one-half pounds, with or without one pound of asbestos. The lime should be pulverized, partially slaked, dried, and bolted, the last to separate the core or lumps, and all the ingredients should be thoroughly dried, agitated, and mixed. In this condition it forms a dry powder and can be packed in bags and shipped or it can be shipped in bulk in cars.

For plastering brick or tile surfaces or for the second coat the hair is omitted and the several ingredients are treated in the same way; but they are mixed in the following proportions, to wit: lime, two hundred pounds; fire-clay, two hundred pounds; sand, eighteen hundred pounds.

The compounds as above prepared when made plastic with water are more easily applied because of the clay and possess greater tensile strength when dried. They dry more quickly and are applicable as well in winter as in summer.

Among the advantages of plaster prepared as described is that exercise of skill or judgment on the part of the workman in proportioning the materials is dispensed with and uniformity in the character of the plaster insured.

The proportions of the several ingredients for the two coats as herein stated can be varied; but any large departure from those proportions is likely to result in defective plaster.

What I claim, and desire to secure by Letters Patent, is—

As an article of manufacture, prepared plaster consisting essentially of pulverized partially-slaked, dried and bolted lime, fire-clay and sand all mixed in substantially the proportions stated.

In testimony whereof I affix my signature in presence of two witnesses.

NELSON J. RUGGLES.

Witnesses:
GEORGE M. FINCKEL,
SAMUEL W. LATHAM.